(No Model.)

J. A. CLOTHER.
HAIR CRIMPER.

No. 273,957.  Patented Mar. 13, 1883.

Witnesses.
C. H. Lamoreux
Lottie Hollister.

Inventor.
Jane A. Clother
per Voorhees & Singleton,
Attys.

UNITED STATES PATENT OFFICE.

JANE A. CLOTHER, OF CUMBERLAND, WISCONSIN.

HAIR-CRIMPER.

SPECIFICATION forming part of Letters Patent No. 273,957, dated March 13, 1883.

Application filed August 28, 1882. (No model.)

*To all whom it may concern:*

Be it known that I, JANE A. CLOTHER, of Cumberland, in the county of Barron and State of Wisconsin, have invented a new and useful Machine for Crimping Hair, of which the following is a specification.

This invention relates to improvements in that class of devices which are designed to crimp or impart a wavy appearance to the hair.

The object of the invention is to produce a simple and efficient device whereby the crimping can be quickly and easily accomplished.

The invention consists in the construction hereinafter set forth.

Figure 1:
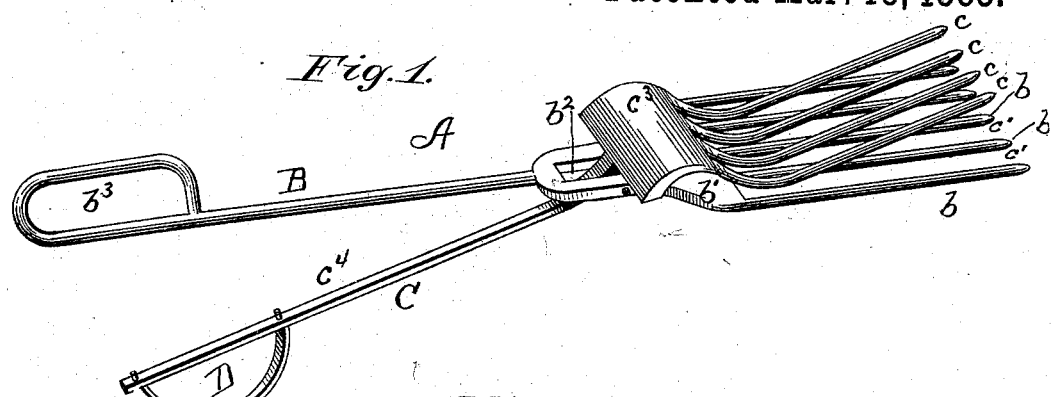
Figure 2:
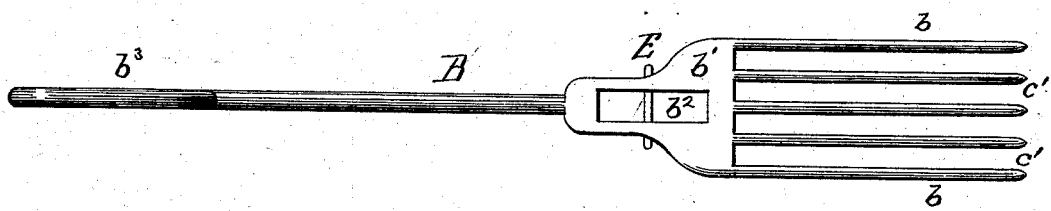
Figure 3:
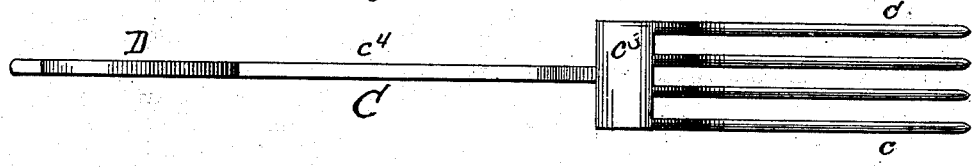
Figure 4:
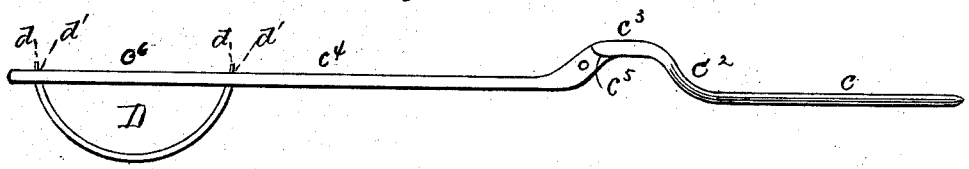
Figure 5:

In the annexed drawings, Figure 1 is a perspective view of the device partly open. Fig. 2 is a plan of one jaw. Fig. 3 is a plan of the other jaw. Fig. 4 is a side view of the lower jaw, and Fig. 5 is a side view of the handle of such jaw.

The letter A represents the complete device, consisting of the upper jaw, B, and lower jaw, C, the drawings showing them inverted. The jaw B has several spaced tines, $b$, at one end united at $b'$, at which point there is formed a slot, $b^2$. The other end, $b^3$, of this jaw is turned on itself, forming a handle or hold for the fingers. This jaw is made straight—that is, the tines continue in a line with the stem. The other jaw, C, has a straight stem, $c^4$, which terminates in a curved plate, $c^3$, from which extend the spaced tines $c$, having the curve $c^2$ at the plate $c^3$. The tines $c$ are one less in number than the tines $b$, and are arranged so as to come opposite the spaces $c'$ between the tines $b$, and are in substantially the same plane with the stem $c^4$. The curve given the stem $c^4$ at the plate $c^3$, the curve of this plate and that of the tines throw the plate $c^3$ out of line with the stem and tines, as shown. At its rear edge the plate $c^3$ is made with under-curved shoulders $c^5$ on each side. At its end $c^6$ the jaw C is provided with two holes, $d'$ $d'$, to receive the ends $d$ $d$ of the thumb-handle D. In putting the jaws together the stem $c^4$ is passed through the slot $b^2$ and the two jaws secured by the pivot-pin E passing through them at such slot. The ends of the handle D are then slipped into the holes $d'$ $d'$ and are held there by the elasticity of the handle or otherwise.

In use the tines are first heated in hot water or by fire, and the tines $c$ are placed beneath the hair and then forced up between the tines $b$, carrying the hair with them. The hair, being thus crimped between the tines of the two sets, is quickly and easily given the wavy appearance so well known.

Having described my invention, what I claim, and desire to secure by Letters Patent, is—

1. In combination with the straight jaw B, the jaw C, having the curved plate $c^3$ and the curve $c^2$, its tines being in substantially the same plane with its stem, as set forth.

2. The straight jaw B, having the slot $b^2$, in combination with the curved jaw C, passing through such slot, as set forth.

3. The straight jaw B, having the tines $b$, slot $b^2$, and handle $b^3$, in combination with the curved jaw C, passing through the slot $b^2$ and having the tines $c$, and removable handle D, as set forth.

JANE A. CLOTHER.

Witnesses:
BERTHA A. PLEMON,
CLARA E. PECK.